United States Patent [19]

Elliott, Jr.

[11] 4,437,968

[45] Mar. 20, 1984

[54] BOILER APPARATUS

[75] Inventor: Robert H. Elliott, Jr., Fort Washington, Pa.

[73] Assignee: Zerpol Corporation, Fort Washington, Pa.

[21] Appl. No.: 329,514

[22] Filed: Dec. 10, 1981

Related U.S. Application Data

[60] Continuation-in-part of Ser. No. 185,850, Sep. 10, 1980, which is a division of Ser. No. 65,816, Aug. 13, 1979, abandoned, which is a continuation-in-part of Ser. No. 907,190, May 18, 1978, abandoned.

[51] Int. Cl.³ .................. B01D 13/02; C02F 1/02
[52] U.S. Cl. .................... 204/301; 159/23; 159/DIG. 28; 204/302; 204/308; 210/96.2; 210/259; 210/321.1; 210/181
[58] Field of Search .................. 159/22, 23, DIG. 27, 159/DIG. 28; 204/301, 302, 308; 210/652, 746, 774, 96.2, 251, 259, 321.1, 181, 433.2

[56] References Cited

U.S. PATENT DOCUMENTS

| | | | |
|---|---|---|---|
| 2,708,658 | 5/1955 | Rosenberg | 204/301 |
| 2,829,095 | 4/1958 | Oda et al. | 204/98 |
| 3,084,113 | 4/1963 | Vallino | 204/301 |
| 3,124,520 | 3/1964 | Juda | 204/86 |
| 3,222,267 | 12/1965 | Tirrell et al. | 204/98 |
| 3,428,557 | 2/1969 | Rivers | 210/746 |
| 3,562,139 | 2/1971 | Leitz | 204/296 |
| 3,654,125 | 5/1972 | Leitz | 204/301 |
| 3,658,470 | 4/1972 | Zievers et al. | |
| 3,827,964 | 8/1974 | Okubo et al. | 204/257 |
| 3,838,774 | 10/1974 | Dolan | 210/96.2 |
| 3,884,777 | 5/1975 | Harke et al. | 204/84 |
| 3,884,778 | 5/1975 | Eng et al. | 204/84 |
| 3,964,985 | 6/1976 | Giuffrida | 204/180 |
| 3,986,955 | 10/1976 | Plicque | 210/259 |
| 4,057,483 | 11/1977 | Giuffrida | 204/301 |
| 4,113,588 | 9/1978 | Watanabe et al. | 204/151 |
| 4,118,295 | 10/1978 | Korenowski et al. | 204/151 |
| 4,124,458 | 11/1978 | Moeglich | 204/98 |
| 4,141,825 | 2/1979 | Conger | 210/259 |
| 4,149,951 | 4/1979 | Eddleman | 204/257 |
| 4,159,235 | 6/1979 | Kammel et al. | 204/272 |
| 4,169,029 | 9/1979 | Smirnov et al. | 204/149 |
| 4,177,119 | 12/1979 | Watanabe et al. | 204/151 |
| 4,210,502 | 7/1980 | Watanabe et al. | 204/151 |
| 4,226,685 | 10/1980 | Portal et al. | 204/105 |
| 4,243,501 | 1/1981 | Wright, Jr. | 204/180 |
| 4,276,140 | 6/1981 | Jain | 204/180 |
| 4,343,683 | 8/1982 | Diggs | 203/DIG. 1 |

FOREIGN PATENT DOCUMENTS

| | | | |
|---|---|---|---|
| 50-759988 | 6/1975 | Japan | 210/652 |
| 51-90752 | 8/1976 | Japan | 210/652 |

OTHER PUBLICATIONS

*Betz Handbook*, 7th Edition, 1976, pp. 110–112.

*Primary Examiner*—Peter A. Hruskoci
*Attorney, Agent, or Firm*—Paul & Paul

[57] ABSTRACT

A wastewater purification and recycling apparatus is provided comprising means for introducing wastewater having a relatively high concentration of impurities from an industrial process into a boiler used to generate working steam for an industrial purpose, heating the wastewater in the boiler to produce a steam component and a precipitated impurity component, using the steam component for the industrial purpose, condensing the steam component as it is used for the industrial purpose to produce water and selectively recycling the water for use in the industrial process and/or boiler while periodically removing the accumulated impurity component from the boiler.

1 Claim, 5 Drawing Figures

BOILER APPARATUS

This application is a continuation-in-part of application Ser. No. 185,850, filed Sept. 10, 1980, which is a divisional of application Ser. No. 65,816 filed Aug. 13, 1979 now abandoned, which is a continuation-in-part of application Ser. No. 907,190 filed May 18, 1978 now abandoned.

This invention relates to an apparatus for treating impure or contaminated industrial wastewater for substantially zero discharge of contaminated wastewater effluents into the environment. To date, there has been no practical method of preventing at least some contamination of the environment by industrial effluents.

There has been a growing concern on the part of naturalists, industrialists, the population in general and federal, state and local legislative bodies concerning the control of industrial pollution of the environment. Laws, ordinances and regulations setting forth more stringent pollution control standards for industrial effluents are almost continuously being enacted and promulgated. It is believed that the standards of present and anticipated law, ordinances and regulations may be met by treating industrial effluents according to the process of the present invention.

The apparatus used in the present invention is contrary to the accepted teachings of the prior art. In essence, the present invention includes introducing impure, contaminated wastewater from an industrial process, such as metal plating, for example, into a normal steam boiler. In contrast, the prior art consistently teaches that boiler feedwater should be as pure as possible to prevent scale from fouling the boiler and to eliminate corrosion of the boiler. Examples of the prior art teaching are found in the U.S. Pats. to Kriegsheim, No. 1,235,815; to Buss et al, No. 1,954,796; to Spaht, No. 2,449,624 and to Hull, No. 3,410,796.

Presently known and used industrial effluent treatment processes include the following:

Ion exchange processes, wherein the effluent is passed through a bed of solid ion exchange resins. A reversible chemical reaction takes place between the ion exchange resins and the effluent by means of which the harmful ions contained in the effluent are interchanged with non-polluting ions from the ion exchange resins. The purified effluent can then be discharged or returned to the process which generates the effluent. After a while, the ion exchange resins become contaminated and must be decontaminated by backwashing. In the process of backwashing the ion exchange resins, considerable wastewater is generated which is more highly contaminated than the original wastewater. Also, the method is expensive and the ion exchange resins have to be replaced periodically.

Reverse osmosis is effective in some cases but is very limited in the types of applications to which it may be applied because of calcium build-up in the semi-permeable membranes. Most industrial processes include a lime treatment which introduces additional calcium to further foul the membranes. Moreover, chromic acid and high pH cyanide baths attack and destroy the membranes.

Evaporation techniques are used in which the effluent passes through one or several evaporator units which concentrate the effluent for further handling. An example of one such evaporation technique is disclosed in Hewitt et al U.S. Pat. No. 3,973,987. These evaporator units are relatively expensive and use considerable amounts of energy. As energy sources become less abundant and more expensive, it will be even more difficult to justify using this method.

Chemical destruct methods are perhaps the most common and lend themselves to both continuous and batch type operations and can be used on small or large volumes of effluent. Most toxic contaminants are reduced to an acceptable level but some exceptions, such as cadmium, cause problems whereby the present and anticipated pollution control standards cannot be met. Substantially zero discharge can be accomplished for a while by chemical destruct methods by recirculating the treated effluent. However, due to the build-up of soluble salts in the treated effluent, the treated effluent can be recycled only a limited number of times. At some point, it is necessary to dump the recirculated effluent which contains a very large build-up of soluble contaminants.

Filtration methods have long been used to separate contaminants from industrial wastewater, but the contaminants must first be precipitated to remove them. Consequently, this method is limited to precipitable contaminants. It is also a slow and costly process.

The present invention relates to a process for purifying contaminated wastewater and recycling the purified wastewater comprising introducing impure wastewater from an industrial process into a steam boiler used to generate working steam for an industrial purpose, heating the wastewater in the boiler to produce a steam component and a precipitated impurity component, using the steam component for the industrial purpose, the steam component condensing during the industrial use thereof to form water, selectively recycling the water for use in the industrial process and/or the boiler. The accumulated impurity component is periodically removed from the boiler.

In its most basic form, the process according to the present invention comprises conducting effluent having a relatively high concentration of impurities from a suitable industrial process into the boiler. Suitable boiler compounds may be added to prevent or minimize scale build-up and/or corrosion and the pH of effluent can be adjusted to a suitable range. Clean steam is produced by the boiler from the contaminated wastewater. The steam is then conveyed to an industrial use, such as heating the plant, driving turbines or providing heat for an industrial process. As the steam is used, it is condensed and then recycled for use in the original industrial process which produces the wastewater and/or the boiler.

Depending upon the type of effluent produced by the industrial process, the effluent may be treated by various purification processes before it is introduced into the boiler.

The process according to the present invention may be a batch process or a continuous process.

The process is very adaptable to existing equipment in most industrial operations being usable with existing steam boilers in the plant. Very little extra energy is required by the boiler to produce steam from the contaminated industrial wastewater as compared to the usually very pure boiler feedwater. Thus, the process and system is relatively economical and energy efficient. Significant economies also result from the recycling of the treated wastewater to the industrial process which produces the wastewater. Thus, in most cases, the treated water is sufficiently pure to substitute for most of the water required for the industrial process. In addition, valuable chemicals can be recovered from the sludge or other precipitate formed in the steam generating unit. The precipitate formed in the steam generating unit may be further concentrated by driving off non-toxic constituents so that there will only be a small amount of toxic constituents remaining which can be easily and safely disposed of.

For a better understanding of the invention reference is made to the following description of a preferred embodiment thereof, taken in conjunction with the figures of the accompanying drawing in which.

Figure 1:
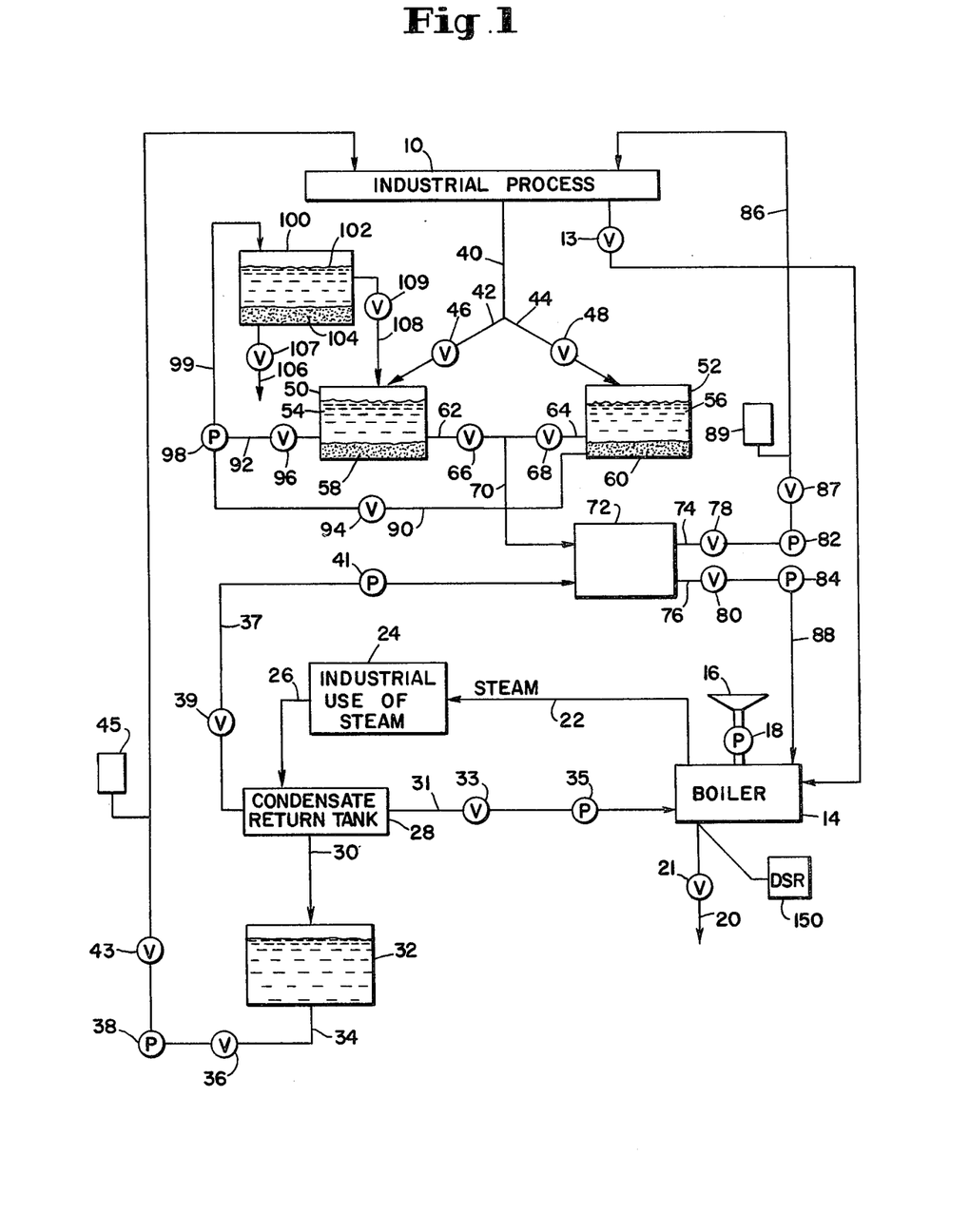
FIG. 1 is a schematic diagram of a system in accordance with this invention and which illustrates a process also in accordance therewith.

Referring to FIG. 1 of the drawing, an industrial process which produces contaminated wastewater effluent is generally designated as 10. The industrial process may include just about any industrial process which produces contaminated wastewater effluent, but the process according to the present invention will be described with particular reference to metal processing, including metal surface finishing, metal plating, pickling and the like. It is to be understood that the present invention has application to a wide range of other industrial processes providing an effluent with a relatively high concentration of impurities and the reference to metal processing is merely by way of example.

The simplest and most basic example of the process according to the present invention may be illustrated with respect to FIG. 1 where the wastewater effluent from the industrial process 10 preferably does not contain extremely large amounts of corrosive chemicals or where it already contains corrosion resisting chemicals. An industrial process such as chrome plating wherein the effluent contains chromium ions which aid in protecting boiler tubes from corrosion is an example.

With these types of processes, the wastewater effluent from process 10 is conducted by means of conduit 12 through valve 13 directly into a steam boiler 14. By "steam boiler" is meant any apparatus including a heat source which is used in a work cycle to produce pressurized steam used in the cycle from water. For example, steam boilers are used to generate working steam for heating buildings, for use in heat exchangers, and for driving turbines. Steam boiler 14 may be of any conventional construction and may include, for example, fire-tube, water-tube or package-type boilers. In steam boiler 14, the wastewater effluent is heated to produce a steam component and a precipitated impurity component which will accumulate in the boiler.

Standard boiler compounds may be introduced into the wastewater effluent before it enters boiler 14 to inhibit or minimize the build-up of scale and to reduce corrosion in the boiler. Alternatively, the boiler compounds can be added to the boiler. Where the boiler compounds are added directly to boiler 14, they are introduced through entry duct 16 by means of pump 18 since these boilers are pressurized vessels. In using these compounds it is desirable to adjust the pH of the effluent to be within a range of about 8 to 10.

Suitable boiler compounds are well known to those skilled in the art. The choice of a proper boiler compound or compounds and the proper amount may be easily determined by mere routine experimentation, taking into consideration the type of wastewater effluent. Suitable boiler compounds include, for example, sodium phosphate; soda ash; volatile amines, such as ammonia, morpholine and cyclohexalamine; chelating agents, such as EDTA; polyacrylamides of the type made according to U.S. Pat. No. 3,463,730 of Booth et al; etc.

The precipitated impurities will accumulate in the boiler 14 and may form a sludge which can be removed by blowdown through conduit 20 and conventional blowdown valve 21. Alternatively, the precipitated impurities may form a hard scale which accumulates in boiler 14 and suitable scraper devices can be used to remove this scale. An example of a suitable scraper device will be disclosed hereinafter. A combination of sludge and scale may accumulate and can be removed by blowdown valve 21 and/or scraper devices.

From boiler 14, the steam component is conducted through conduit 22 as working steam used for any industrial purpose as indicated at 24, such as heating a plant or heat exchanger or for driving turbines. As the steam is used for the industrial purpose it condenses forming relatively pure water which is conveyed through the conduit 26 to a condensate return tank 28.

The condensed water can be selectively pumped from condensate return tank 28 directly to boiler 14 by pump 35 through conduit 31 and valve 33 when there is insufficient untreated or pretreated wastewater effluent entering the boiler. Preferably, valve 33 is controlled by a standard water level sensing means in the water tank.

Alternately, the water may be conducted from condensate return tank 28 through conduit 30 to a storage tank 32. The water from storage tank 32 is conducted through conduit 34, valve 36, pump 38 and check valve 43 back to the original industrial process to be used therein. Where pump 38 is necessary, an accumulator device 45 should be used to compensate for any surge in line pressure resulting from the starting of the pump and otherwise help to maintain uniformity of pressure. The accumulator device may be any standard device incorporating a piston, diaphragm, or bellows. Pump 38 may be unnecessary where gravity feed may transfer water from storage tank 32 to industrial process 10. Another variation would be to let the condensate go directly to the industrial process 10 or to the process from the condensate return tank 28.

Many industrial processes yield wastewater effluents containing insoluble ions. In this case, a process according to the present invention can include some pretreatment of the wastewater effluent. One such process is described with reference again to FIG. 1 of the drawing.

Wastewater effluent containing dissolved and undissolved ions produced by industrial process 10 is conducted through conduits 40, 42 and 44 and valves 46 and 48 into settling tanks 50 and 52. Of course, depending upon the system, any number of settling tanks may be used.

For the purpose of illustration, assume that the wastewater effluent contains 1,000 ppm suspended and dissolved solids. Suitable flocculents or precipitating agents, such as lime, are added to the wastewater effluent in settling tanks 50 and 52. The tanks are preferably used alternatively, that is, one tank is filled then the other, so that the process is a batch type process. A continouous system can also be used if desired. After a period of time, the effluent separates into two components, a relatively clear component 54 and 56 containing only dissolved solids, such as sodium and potassium chlorides, nitrates, sulfates, etc. in a concentration of about 1,000 ppm, and a sludge or precipitated component 58 and 60, having a concentration of solids of about 2-5%.

In many instances, once the suspended solids are removed from the wastewater effluent, it may be recycled back to the industrial process for use therein. Thus, the component 54 and 56 containing the dissolved solids is removed through conduits 62 and 64 and through valves 66 and 68 from settling tanks 50 and 52, respectively. Conduits 62 and 64 are connected to tanks 50 and 52, respectively, at a point above the anticipated level of sludge 58 and 60 so that only components 54 and 56 are removed. The component containing the dissolved solids is then conveyed through conduit 70 to storage tank 72.

The level of liquid in tank 72 can be raised and the concentration of dissolved solids therein diluted by adding water from condensate return tank 28. Water is selectively conveyed from tank 28 to tank 72 through conduit 37, valve 39 and pump 41. The pump and valve can be controlled by level sensing devices and concentration sensing devices known to those skilled in the art. The liquid containing the dissolved solids in tank 72 is recycled through conduit 74, valve 78, pump 82, check valve 87 and conduit 86 back to industrial process 10. Of course, where gravity feed is available, pump 82 is unnecessary. Where the pump is used, accumulator device 89 is also used for maintaining uniformity of pressure.

The recycling of the wastewater effluent component containing only dissolved solids aids in greatly reducing the amount of water necessary from primary sources, such as the municipal water system, thus conserving water, a valuable natural resource. In addition, many of the dissolved chemicals contained in the component containing the dissolved solids are beneficial for the industrial process. Thus there may be a two-way cost savings. Typically, the component containing the dissolved solids may be recycled for a long period of time, such as, for example, one year. The recycled component will eventually contain too large a concentration of dissolved solids to be useful in the industrial process. At that time, it is introduced into boiler 14 through conduit 76, valve 80, pump 84 and conduit 88. Boiler compounds are preferably added to the pretreated, recycled component before it is introduced into the boiler. The boiler produces steam for an industrial use during which the steam is condensed and the resulting water is recycled to industrial process 10 and/or ler 14 as set forth hereinbefore.

Preferably, a portion of the component containing the dissolved solids in tank 72 is continuously recycled to the industrial process while a smaller portion is being conveyed continuously to the boiler. In this manner, the industrial process receives a recycled component containing dissolved solids and a substantially pure component which has gone through the steam and condensation cycle as set forth hereinbefore. Processes that require high quality water can receive condensate continuously and this method can eliminate ion exchange units.

Sludge 58 and 60 in tanks 50 and 52 may be pumped through conduits 90, 92, 99 and through valves 94 and 96 by pump 98 to a concentrator tank 100. The sludge 58 and 60 from settling tanks 50 and 52 may typically have a concentration of about 2-5% solids. The sludge is transferred to concentrator tank 100 and after standing overnight produces a relatively clear component 102 containing dissolved solids and a concentrated sludge component 104 which may over a period of time build to 15% solids content. Component 102 is recycled to tank 50 through conduit 108 and valve 109 for recycling to industrial process 10 and/or to be conveyed to boiler 14 as described hereinbefore. When concentrated sludge 104 becomes too concentrated or builds up to a predetermined level in tank 100, it is discharged through conduit 106 and valve 107.

Concentrated sludge 104 and any sludge or scale formed in boiler 14 may be concentrated further by an suitable process. The more concentrated sludge and scale is reduced to a very small volume and may be readily discarded.

In practicing this invention it has been found that because of the nature of the industrial wastewater fed to the boiler 14, there is a foaming problem in the boiler and a tendency for the liquid to surge up and down therein. This means that the boiler 14 was shutting down and/or discharging the wastewater instead of steam from the boiler. It is thus an important aspect of this invention to provide an effective amount of headroom at the top of the boiler to accommodate the foam and to relieve the problem of discharging water instead of steam. For most boilers it is believed that there should be provided at least about one foot of space between the top of the wastewater and the top of the boiler 14. If necessary a conventional float switch can be provided at the desired water level in the boiler 14 and can operate a valve at the inlet to the boiler to prevent overloading the boiler with wastewater.

The process according to the present invention provides for substantially zero contaminated wastewater effluent discharge. The wastewater effluent is treated in accordance with the present invention and never leaves the system. The only contaminants which leave the system are in the form of highly concentrated sludge and/or scale which are easier to dispose of than large amounts of liquid effluents.

The process will now be described in more detail with reference to the following specific, nonlimiting examples:

EXAMPLE 1

Approximately 500 gallons of recycled wastewater effluent were obtained from an electroplating process. The recycled wastewater effluent had been used for about one year. The wastewater effluent contained heavy metals, such as cadmium, copper, nickel, tin, zinc and iron. In addition, it contained cyanide, hexavalent chrome, oil, alkaline cleaner and various acids.

The cyanide was destroyed by normal chlorination. The hexavalent chrome was reduced by sulfite and the oil removed continuously with an oil separator. The heavy metals were precipitated with excess lime and polyamine flocculents. After this treatment, a sludge component and a clear component remained. The pH of the clear component was adjusted to approximately 8 and it was pumped to a reservoir for use in the electroplating process as needed. The clear component was recycled once or twice each week and after about a year, the water became unusable due to a build-up of dissolved solids and interference with the plating operation. The dissolved solid were about 8,500 mg/l and seemed to consist mostly of sodium sulfate, sodium chloride and sodium nitrate. Other cations, such a potassium, calcium, magnesium and ammonia were present, but no efforts were made to determine exact amounts. Organic materials, such as wetting agents, were also present.

The recycled component containing the large concentration of dissolved solids was then introduced into a small laboratory boiler for testing to see if the boiler would separate the contaminants from the steam and not damage the boiler.

The steam produced by the boiler was condensed and the water condensate was relatively clean. It contained some ammonia and iron and had a pH of 8.8. The sludge produced in the boiler was soft and oozed out of a control valve as the experiment progressed. The boiler contained an average of about 4 gallons of the component containing the high concentration of dissolved solids as the 500 gallons of wastewater were passed through the boiler.

The control valve of the laboratory boiler corresponds to a typical blowdown valve. However, in this invention, normal blowdown would not occur. Typical boiler blowdowns occur when solids reach the range of 500 to about 5,000 mg/l (0.05–0.5% by weight). In the present invention, solids would be removed at concentrations from about 1 to about 99% by weight, and optimally, at about 60 to about 70% by weight. When the boiler was disassembled, some hard scale was found and removed.

EXAMPLE 2

A 55 gallon drum of chrome waste was obtained from another plant that processed copper and copper alloys. The chrome was reduced to the trivalent state and the sludge represented about 50% of the solution by volume. The pH of the solution was adjusted to 8, the solution was agitated and allowed to stand for about 20 minutes. The sludge was still about 50% by volume and remained so after leaving the sludge stand overnight. Solids by weight of the sludge were about 5%.

The waste was then introduced into the laboratory boiler. There was concern that the sludge would be difficult to concentrate in the boiler because of its voluminous nature. However, this did not prove to be the case. The green sludge did not show up in the boiler sightglass or enter the stream port. Difficulties, however, were encountered in other aspects. Even though the pH was adjusted and maintained at about 8, the steam had a pH of 2.4 and badly corroded the boiler steam lines. Excess sodium sulfite was present, yielding corrosive sulfur dioxide and sulfurous acid. Hexavalent chrome was added to remove the excess sodium sulfite and the experiment repeated. When approximately 5 mg/l of hexavalent chrome was maintained in the boiler, no further sulfur dioxide was carried over with the steam and the pH of the condensate was about 8. There appeared to be no further corrosion of the boiler system.

EXAMPLE 3

Another experiment was carried out with the same chrome wastewater as used in Example 2. The conditions in the boiler were 5–10 ppm of hexavalent chrome and the pH ranged from about 8 to about 10. Morpholine was added to the boiler to adjust the pH of the steam so that as the steam entered the condensate tank, the pH was between 7.5 and 8.5.

The chrome sludge did not interfere with the normal boiler conditions. The condensate showed the presence of morpholine and a pH of about 8. No noticeable corrosion could be detected in the boiler or in the steam lines. The concentrated trivalent chrome was removed from the boiler through the control valve at about 60% solids. No hard scale formed on the inside of the boiler.

The solids removed from the boiler were further concentrated by placing the sludge on a filter cloth which was placed on a steam table. More water was driven off and the solids were concentrated to about 97% by weight. The sludge was dark green in color and hard. It was crumbly and easily separated from the filter cloth.

EXAMPLE 4

The following example was conducted in the laboratory as part of an economic study. It is believed that the economic savings set forth below would be achieved.

Conditions at another plant were observed and samples of wastewater effluent taken. Particular emphasis was placed on the economics of this plant which illustrated the energy savings associated according to the present invention. Approximately 750,000 pounds of steam were generated daily in the winter for heating and processing in the plant. In the summer, about 200,000 pounds of steam were used daily. The water discharge varied between 100,000 and 140,000 gallons per day throughout the year. About 75% of the water was used in the electroplating department. Even though the water was cleaned by chemical treatment before being discharged to a steam, it was not considered clean enough for recycling to the plating department. Samples of the chemically treated wastewater effluent were run through the laboratory boiler and the water condensed from the steam produced by the boiler proved to be of high quality and satisfactory for the plating operation.

If the wastewater effluent from the plating operation only were run through a separate evaporator, the additional cost for energy would be in excess of $2,000.00 per day, which would double the budget cost. However, if the wastewater effluent were introduced into their existing plant boiler, the energy costs would be only slightly increased. For illustration, on a cold winter day, 765,000 pounds of steam were generated and 583,440 pounds (78,000 gallons) of steam were used in the plating area. By passing all of the wastewater through the existing boiler in accordance with the present invention, there would be more than enough water for daily usage. A further advantage would be that the condensate would be warm (75–100° F.), which would facilitate rinsing in the plating operation.

Since the steam had to be generated anyway, the only additional costs would be heating the condensate return water more than previously done. It was estimated that 10% additional energy would be required for this purpose, but this would be offset by less blowdown, so that the net energy loss would be only 4 to 5%.

In the summer, not enough steam would be generated to process the water according to the present invention each cycle. A determination would have to be made as to which process in the plant were most critical and would require the pure high quality condensate produced in accordance with the present invention. The rest of the operation would use recycled water from normal chemical destruct methods. The net result would be a substantially closed loop system and substantially no water would ever leave the system in liquid form containing pollutants, except in the concentrated sludge from the boiler.

EXAMPLE 5

Several 55 gallon drums of water effluent were collected from a plant before waste treatment procedures were carried out on the waste effluent. The cost of chemicals at this plant was very high for reducing hexavalent chromium and precipitating heavy metals. The only pretreatment before passing the waste through the boiler was to adjust the pH to 9 and add polyamines to prevent the scale formed from sticking to the boiler plate. Hexavalent chromium was maintained in the boiler. The water which was condensed from the steam produced by the boiler was of excellent quality, but the scale did adhere somewhat and mechanical scraping was necessary.

Referring to FIGS. 2-5 of the drawing, there is shown a boiler 10a incorporating scale scraping apparatus in accordance with another aspect of the present invention and which is usable in the system of FIG. 1.

Figure 2:
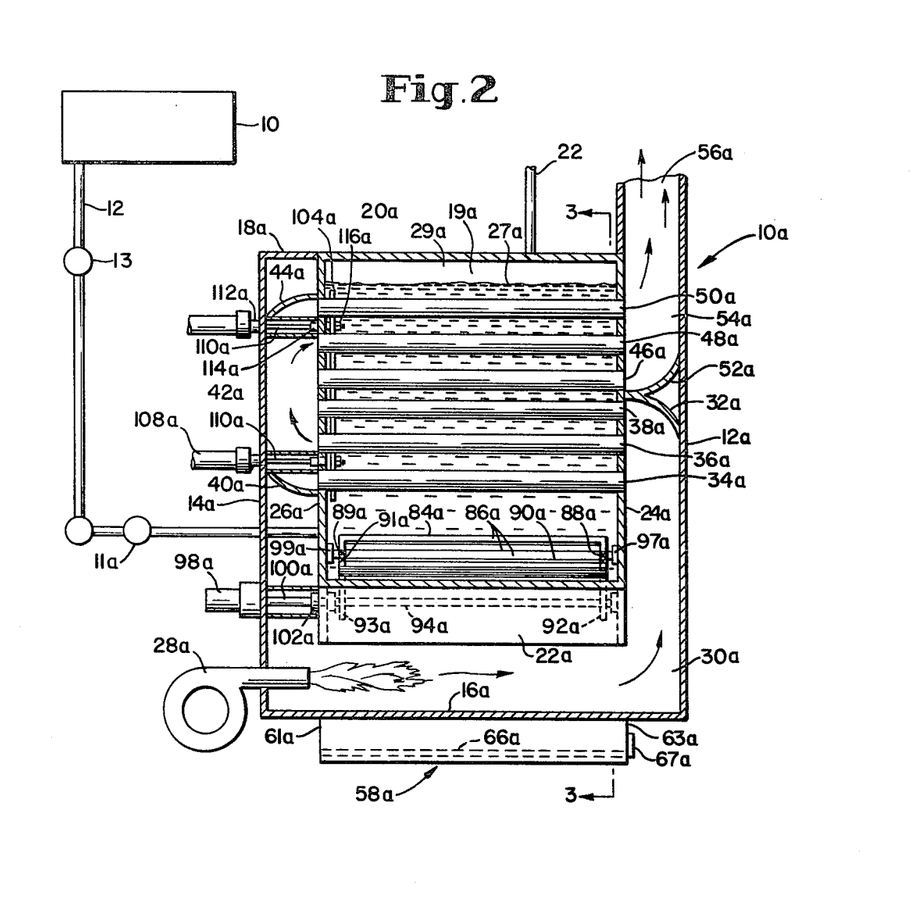
FIG. 2 is a sectional view of a fire-tube boiler illustrating a scale scraping apparatus and blowdown features in accordance with the present invention.

With reference to FIG. 2, boiler 10a represents a standard fire-tube boiler wherein heat travels through tubes within the boiler's water tank to thereby heat the water. The wall scraping appartus according to the present invention may be used in any type of boiler in which scale may form on the walls of a water tank. The apparatus used in scraping scale from boiler tubes obviously requires that the boiler be a fire-tube boiler or other type of boiler in which water surrounding tubes is heated by heat transfer from hot gases or liquid within the tubes, such that scale forms on the outside surfaces of boiler tubes. The drawings illustrate a fire-tube boiler so that the wall scraping apparatus and tube scraping apparatus both may be illustrated conveniently. Preferably, a fire-tube boiler would contain both the wall scraping apparatus and the tube scraping apparatus according to the present invention. Boiler 10a includes outer side walls 12a and 14a, outer bottom wall 16a and outer top wall 18a which may be integral or contiguous with water tank top wall 20a.

Figure 3:
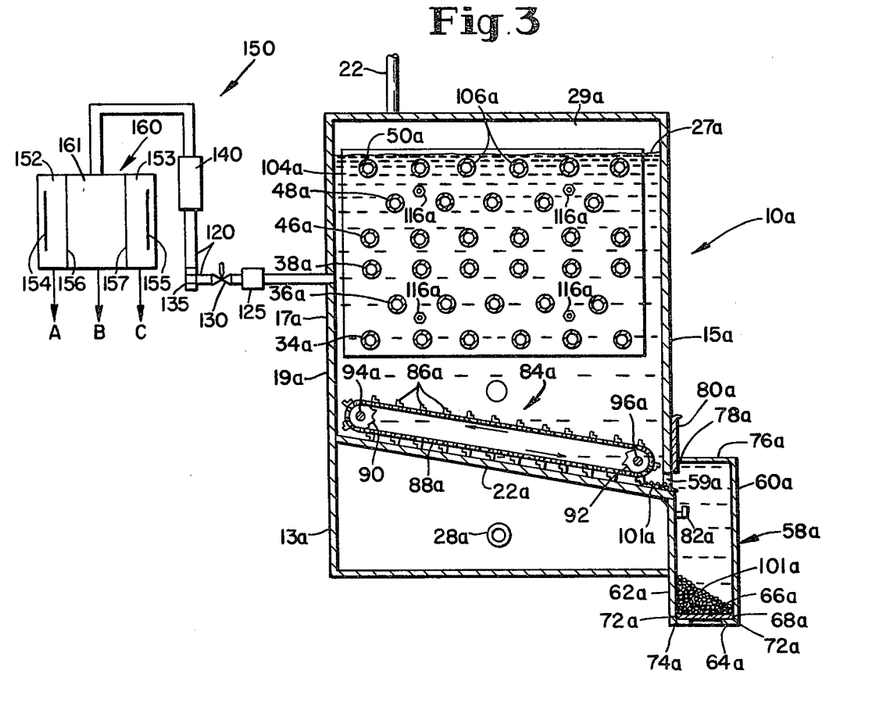
FIG. 3 is a sectional view of the apparatus illustrated in FIG. 2 taken along line 3—3 of FIG. 2, illustrating blowdown features in conjunction with the DSR apparatus in accordance with the present invention.
Figure 4:
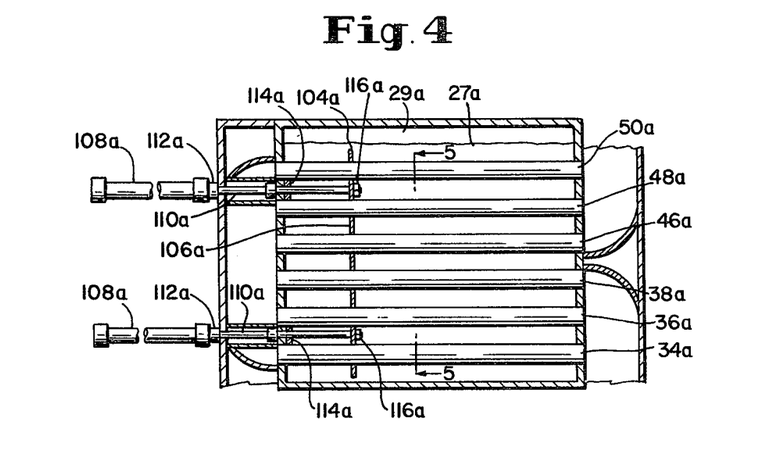
FIG. 4 is an enlarged sectional view of the apparatus illustrated in FIG. 2 showing the movement of the scraper plate.
Figure 5:
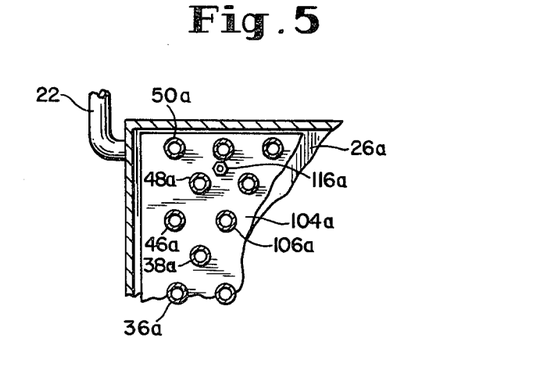
FIG. 5 is a partial sectional view of the apparatus as taken along line 5—5 of FIG. 4 showing the scraper plate.

In addition to top wall 20a, tank 19a comprises bottom wall 22a and side walls 24a and 26a. Bottom wall 22a is shown in its preferred form as sloped toward a scale receptacle 58a (see FIG. 3). As best shown in FIG. 3, front wall 13a of boiler 10a is contiguous with front wall 17a of tank 19a. Rear wall of tank 15a also comprises the rear wall of the boiler. No novelty is claimed in the precise construction of the boiler or the water tank. The drawing figures are merely representative of standard fire-tube boilers in which the tube scraping apparatus of the present invention is operable. The wall scale scraping apparatus according to the present invention is operable in any type of boiler with flat or curved smooth surfaces upon which scale forms.

Water is pumped into tank 19a through conduit 12 and valve 13 which may be controlled by a standard water level detector assocaited with tank 19a. Conduit 12 is also provided with check valve 11a. When the boiler with the scale scraping apparatus is used to purify industrial wastewater, conduit 12 is connected to a source of industrial wastewater such as industrial process 10 shown in FIG. 1. The wastewater may be conveyed directly to boiler 10a or may be pretreated in accordance with the process previously described or any other desired process including pretreatment in DSR unit such as unit 150 which is more fully described hereafter with respect to concurrent treatment of blowdown of wastewater from boiler 10a. The water is introduced into the tank to a level 27a just above the uppermost row of boiler tubes 50a so as to allow space in the tank for steam 29a. Steam produced by the boiler exits through conduit 22 and its flow is controlled by any conventional valve, now shown. The boiler may include valve 2 and conduit 20 as sown in FIG. 1 or feed a DSR unit which is designated generally as 150. The boiler may additionally include any conventional valved inlet port, not shown, for the addition of standard boiler compounds to minimize scale build-up and corrosion.

Burner 28a may be any suitable, conventional burner of the type used in boilers, such as a gas burner or oil burner. Heat from burner 28a travels through chamber 30a between the outer boilrer walls and the water tank walls. The heat is then routed by baffle 32a through fire tubes 34a, 36a and 38a into a chamber 42a. Chamber 42a is defined by boiler outerwall 14a, tank wall 26a and baffles 40a and 44a. From there, the heat progresses through fire tubes 46a, 48a and 50a into chamber 54a bounded by boiler outerwall 12a, tank wall 24a and curved baffle 52a. In its path through the boiler, the hot gases transfer their heat through the fire tubes to the water and then are exhausted through flue 56a.

Attached to tank 19a is scale receptacle 58a which receives scale and/or sludge scraped or as a result of blowdown, from tank 19a through communication means 59a. Communication means 59a may comprise an elongated opening, for example. Receptacle 58a comprises rear wall 60a, front wall 62a, side walls 61a and 63a and bottom wall 64a. Receptacle 58a is illustrated in FIG. 2 as being attached to the lower portion of tank 19a. However, the location of receptacle 58a is not critical and it may be located in any convenient manner for receiving scale scraped from the interior of the tank and/or from the tubes and to effectuate blowdown of boiler 10a.

In the embodiment illustrated in FIGS. 2 and 3, bottom wall 64a of receptacle 58a includes an opening 59a which is sealed by an openable closure member, such as sliding door 66a which slides in tongue and groove slots 68a and 72a in rear wall 60a and front wall 62a, respectively. Preferably, suitable conventional gasket material or sealing means 72a and 74a are disposed along the junction where door 66a meets with receptacle 58a to assure that receptacle 58a is pressure-tight.

Receptacle 58a should be capable of being closed off or sealed from tank 19a. As best shown in FIG. 2, this may be done by providing an openable closure member, such as sliding door 80a which slides down through slot 78a in top wall 76a over opening 59a into retainer 82a. Suitable conventional gasket material or sealing means should be used to prevent water or pressure from leaking out of tank 19a or receptacle 58a.

Wall scale scraping apparatus 84a is shown for purposes of illustration as scraping scale from bottom wall 22a of tank 19a. This arrangement is shown for purposes of illustration only, since wall scale scraping apparatus 84a may be mounted so as to scrape scale from the interior surface of any of the walls within the tank or from any substantially smooth, flat or curved surface within a boiler water tank, such as baffle plates and the like.

Wall scale scraping apparatus comprises at least one, and preferably a plurality of scraping blades 86a having their ends mounted on endless chains 88a and 89a. Chain 88a is mounted around sprockets 90a and 92a, and chain 89a is mounted around sprockets 91a and 93a. Sprockets 90a and 91a are mounted on shaft 96a, the ends of which are mounted for rotation within bearings 97a and 99a, respectively. The bearings are preferably attached to the interior of the walls of tank 19a. Sprockets 92a and 93a are mounted on shaft 94a, the ends of which are also rotatably mounted within bearings attached to the interior of the walls of the tank. For purposes of illustration, sprockets 92a and 93a are the driving sprockets and sprockets 90a and 91a are the driven sprockets. It does not matter which sprockets are the driving sprockets and which sprockets are the driven sprockets. Driving shaft 94a passes through wall 26a, through suitable bearing and sealing means 102a and connects with shaft 100a. Shaft 100a is driven by motor 98a. Shaft 100a passes through pipe or tubing 103a to prevent deterioration and/or any possible corrosion of the shaft resulting from contact with the hot flue gases. Preferably, tube 103a is open to the atmosphere at the end exterior to the boiler so the ambient air can cool the shaft. In some cases, it may be desirable to blow cooling air into the tube to control the temperature therein.

Where the wall scale scraping apparatus is used to scrape scale from the curved walls used in many boilers having cylindrical water tanks, the conveyor may move within tracks at the ends of the tanks. This permits the entire interior curved walls of the cylindrical tank to be scraped at once.

The operation of wall scale scraping apparatus 84a will now be described. As scale builds up on the interior surface of wall 22a, motor 98a is actuated to drive the conveyor upon which scraper blades 86a are mounted. The scraper blades bear against the interior surface of wall 22a so that substantially all builtup scale can be removed therefrom by the scraper blades. Throughout this application, the term "substantially adjacent" refers to the bearing contact of the scraper blades or scraper plate against the surface or surfaces to be scraped.

As the scraper blades 86a move along the interior surface of wall 22a, scale 101a is scraped therefrom. The scraped scale is conveyed by the blades through opening 59a and into scale receptacle 58a. Motor 98a may be manually actuated as desired or may be controlled automatically by a control device, such as a timer, which periodically actuates the motor. For example, the control device may actuate the motor once an hour, once a day, etc. The period may be readily determined by simple observation depending on the type of water or wastewater used in the boiler, the size of the boiler, and the like.

After a given period of time may be readily determined in each instance by simple observation, scale 101a builds up a sufficient height in receptacle 58a to warrant removal therefrom. In removing the scale from the receptacle, closure member 80a is closed, sealing tank 19a from receptacle 58a. Receptacle 58a contains the scale and is full of water which may be under pressure. The pressure in receptacle 58a may be variable and controllable by a bleed valve or additional pressure source, not shown. After door 80a is shut and receptacle 58a is sealed from tank 19a, sliding door 66a is opened, allowing the water and scale to fall by gravity from receptacle 58a into suitable container for further processing or disposal. The pressure of the water in receptacle 58a also helps to expel all of the scale from the receptacle.

Likewise blowdown of the boiler 10a may be effectuated in the same manner as described above with respect to removal of the scale by shutting door 80a and opening 66a premitting removal of the sludge from receptacle 58a. Alternately, door 80a may remain shut during operation of boiler 10a and at the appropriate time period be opened in a manner to effect blowdown. Because receptacle 58a contains a relatively small amount of water compared to the amount of water in the boiler water tank 19a, there is an insiginificant amount of water loss and/or pressure loss within tank 19a in the preferred mode of operation. When receptacle 58a has been emptied, door 66a is closed so that receptacle 58a is again water-tight and pressure-tight. At this time, door 80a is opened, allowing water to enter receptacle 58a from tank 19a. Wall scraping apparatus 84a may then be actuated as desired.

Although doors 80a and 66a may be manually controlled, it is preferred that they be automatically controlled so that door 80a closes before door 66a is opened and so that door 66a is closed before door 80a is opened. The control means may comprise any conventional device, such as small hydraulic cylinders controlled by simple valve means, such as solenoids, or shafts controlled by gears, such as worm gears, rack and pinion gears, etc. driven by a motor actuated by a simple control circuit. It is believed that suitable control means may be readily designed by those skilled in the art.

The boiler scraping apparatus according to the present invention also includes a tube scale scraping apparatus which may be used either independently of or in conjunction with wall scale scraping apparatus 84a.

The tube scale scraping apparatus comprises scraper plate 104a which is a thick metal plate made of a hard metal, such as mild steel commonly used to make boiler walls. The thickness of scraper plate 104a and the material from which it is made depends on its size, the number of tubes to be scraped, the size of the tubes to be scraped, the necessary length of travel, the type of boiler feedwater being used and what additives, if any are being introduced into the water tank. The scraper plate need only be sufficiently hard to remove scale from the tubes and sufficiently stiff so that it does not bind or become skewed during its travel along the tubes.

Scraper plate 104a includes a plurality of discrete apertures 106a, each of which is substantially adjacent to each of the tubes which pass through the apertures. Thus, the diameter of each aperture 106a is only very slightly larger than the outside diameter of its respective tube allowing the scraper plate to bear against the outer wall of the tubes to remove any scale therefrom.

Scraper plate 104a is disposed substantially perpendicular to the longitudinal axis of the tubes and is driven in a direction parallel to the longitudinal axis of the tubes. The direction of travel may be best seen by comparing the position of plate 104a in FIG. 2 to the position of the plate shown in FIG. 4. In FIG. 2, the plate is at the beginning of its travel and in FIG. 4 the plate is about ¼ of its full extent of travel to the right as shown in the figures.

Scraper plate 104a is driven by driving means, such as hydraulic cylinders 108a having shafts 110a passing through bearing and sealing means 112a and 114a mounted in walls 14a and 26a, respectively. Shafts 110a pass through tubes 111a so that the shafts are protected from any damage from the hot flue gases. As with tube 103a, tubes 111a can be open to the atmosphere or be connected to devices for cooling the shafts passing through the tubes. Shafts 110a are connected to scraper plate 104a by means of any suitable fasteners, such as nuts 116a which fit on the threaded ends of shafts 110a. Hydraulic cylinders 108a are shown as the driving means only for purposes of illustration. Other equivalent driving devices could be used, such as motor driven worm gears, rack and pinion gears, and the like.

A plurality of cylinders are shown as being connected to scraper plate 104a. It is only necessary to provide a driving means which is attached to scraper plate 104a in a sufficient number of locations to prevent the plate from binding or becoming skewed. The number of locations depends on the thickness and stiffness of plate 104a and the driving force applied thereto. While the drawings indicate that four hyradulic cylinders are attached to plate 104a, one hydraulic cylinder or equivalent driving device may suffice if torque on the plate can be substantially eliminated by the way the device is attached to the plate. Thus, for example, the four shafts 110a could be attched to a single thick plate member outside of the boiler which itself is connected to a hydraulic cylinder or equivalent driving means. The thick plate member serves to equally distribute the driving force among the four shafts.

Preferably, the driving means is actuated by a control device which assures that scraper plate 104a does not become skewed. The control means preferably includes a timing device for periodically and/or automatically driving the scraper plate at any desired interval, such as hourly, daily, or the like.

As scraper plate 104a moves along the tubes, it scrapes scale from them. Since the scale has a specific gravity greater than the specific gravity of water, the scale will fall toward the bottom of the tank 19a. If wall scale scraping apparatus 84a is used to scrape scale from the bottom of the tank, it may be actuated manually or automatically in response to the accumulation of loose scale scraped from the tubes which falls on the bottom of the tank. In this case, the apparatus operates as set forth hereinbefore. If the tube scale scraping apparatus is not used in conjunction with the wall scale scraping apparatus on the bottom wall of the tank, scale scraped from the tubes by scraper plate 104a may fall onto sloped floor 22a and by gravity be conveyed into receptacle 58a. Of course, the slope of bottom wall 22a may be made steeper so that the loose, scraped scale may be collected in receptacle 58a more readily. Scale is removed from receptacle 58a in the same manner as set forth hereinbefore. It is only necessary to provide means for sealing the tank from the receptacle so that the water and pressure in the tank are not lost when the receptacle is emptied.

Referring now to FIG. 3, both the scraping mechanisms and the blowdown mechanisms of the preferred embodiments of the invention are depicted. It is to be understood that the blowdown mechanism(s) may be used at various locations of the boiler consistent with obtaining the desirable end result and/or consistent with the location and type of scraping apparatus and/or consistent with the type of boiler, and the like. It is also to be understood that the scale and/or sludge in the boiler generally comprises suspended solids and dissolved solids, which may, consistent with the process of the present invention be removed from the boiler by blowdown. However, in the preferred embodiment depicted in FIG. 3, the bulk of the suspended solids is removed and deposited in receptacle 58a as set forth above, and the bulk of the dissolved solids is removed into DSR unit 150. DSR unit 150 is preferably positioned in a manner to remove wastewater from boiler 10a which wastewater contains a relatively minor amount of suspended solids, and thus, will generally be located away from bottom wall 22a of boiler 10a where the suspended solids tend to settle. DSR unit 150 could, however, operate to remove and treat the wastewater entering and/or being blowndown into receptacle 58a by providing conduit 120 in communication with receptacle 58a in the same manner as conduit 120 communicates with boiler 10a as described below with respect to DSR unit 150.

DSR unit 150 is shown in FIG. 3 as including conduit 120 in pressure-tight communication with boiler 10a to permit partially concentrated wastewater located within boiler 10a to enter conduit 120 flowing therein to controller 125. Controller 125 is a valve actuated mechanism which measures the conductivity of the wastewater and in response thereto operates a solenoid, not shown to open controller 125 permitting the wastewater to pass from the boiler through conduit 120 and past controller 125. Controller 125 can be preset to activate the solenoid for opening and closing controller 125 in response to the conductivity of the wastewater which would, for example, correspond to a certain concentration of wastewater. For example, controller 125 would be preset to activate the solenoid and permit the wastewater to pass therethrough at a predetermined percentage concentration which may vary, for example, between 5 and 30%. Moreover, controller 125 while continuing to measure the conductivity of the wastewater passing therethrough could also be preset to activate the solenoid to close controller 125 stopping passage of the wastewater therethrough thus prevent the wastewater from entering conduit 120 from boiler 10a. In operation of controller 125, the predetermined setting may dictate activation of the solenoid to open controller 125 at a percentage concentration of, for example, 20%, whereupon the wastewater would pass from boiler 10a through conduit 120 and after a period of time, the resultant concentration of the wastewater would decrease to a level of, for example, 15%, whereupon the solenoid would again be activated to close controller 125, whereupon boiler 10a would operate to increase the concentration of the wastewater therein up to the predetermined percentage concentration at which time controller 125 would again permit the wastewater to flow from the boiler 10a through conduit 120 into DSR unit 150. After passage through controller 125, the wastewater passes through needle valve 130 which acts to control the rate of flow of the wastewater. Thereafter, the wastewater enters bell trap 135 which acts to remove and/or further separate the dissolved solids from any suspended solids permitting the dissolved solids to further proceed in conduit 120 to flow meter 140 which is a rotameter as it is known in the art and used to carefully measure the flow rate of the wastewater in conduit 120. After passage through flow meter 140, the wastewater enters the actual DSR unit which is specifically designated 160. In the preferred embodiment, unit 160, comprises central chamber 161, two end chambers 152 and 153, two electrodes 154 and 155, and two ion-permeable membranes 156 and 157. A typical unit 160 is more fully described in U.S. Pat. No. 2,708,658 which disclosure is incorporated herein by this reference. While no novelty is claimed for the apparatus, unit 160, acting alone, an embodiment of the present invention contemplates cooperation of DSR unit 150 with boiler 10a which produces advantages relating to zero discharge of wastewater effluent, regeneration of industrial chemicals, potential use of the steam generated in the boiler for an industrial purpose, and ultimate recycling of same together with the regenerated chemicals back to the industrial process.

In the preferred embodiment, the wastewater enters central chamber 161 where it is treated by unit 160 diluting the concentration of the dissolved solids in the wastewater and forming stream B which may exit unit 160 and be recirculated to, for example, storage tank 32 for use in the industrial process or in a manner consistent with the process of the present invention. The dissolved solids and/or ions are selectively transferred from chamber 161 to either chamber 162 or 163 as determined by the arrangement of electrodes 164 and 165 and by the arrangement of ion-permeable membranes 166 and 167 to regenerate industrial chemicals which can form streams A and C which may then be utilized in the industrial process. In operation of unit 160, electrode 164 may be the anode, electrode 165 the cathode and ion permeable membrane 166 be an anion permeable-ion exchange membrane, with membrane 167 being a cation permeable ion-exchange membrane. In this manner, unit 160 could be utilized to generate, for example, $H_2SO_4$ 163 and NaOH in chamber 162.

However, it is to be understood that DSR unit 160 can be utilized to regenerate various useful industrial chemicals dependent upon the type of wastewater, the industrial process producing such wastewater, and the like. In operation, the wastewater entering chamber 161 is diluted by selectively removing various ions and/or dissolved solids components from the wastewater in chamber 161 and transferring same to chambers 162 and/or 163 to generate the useful chemical product. DSR 160 simultaneously dilutes the wastewater on chamber 161, transforming same into a water component, stream B, having a low concentration of impurities. By the term low concentration of impurities, it is meant that stream B will be transformed into a component which can be reused and/or cycled in the industrial process. Generally, stream B would have a low concentration of dissolved solids or impurities of, for example, less than 1000 ppm (parts per million), and generally about 500 ppm.

Thus the present invention truly provides a zero discharge system which maximizes zero discharge of wastewater effluent, regeneration of chemicals and which can be used to recycle the regenerated chemicals back into the industrial process. This in turn reduces the need to haul away a large portion of concentrated solids since these are regenerated to useful chemicals which may very often be utilized in the industrial process. Thus, the economies of the operation as set forth in Example 4 are further enhanced by the DSR unit which helps to eliminate rather than add to industrial pollution of the environment. The economies of using a boiler for treatment of wastewater as set forth above are also realized in operating the DSR unit in combination with the boiler since conservation of energy is realized in operation of the DSR unit. Since the wastewater enters such unit at elevated temperatures of, for example, about 180° F., the energy required to operate the DSR unit is therefore less.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for use in treatment of wastewater effluent from an industrial process wherein a steam component, a useful industrial chemical, and a treated water stream having a low concentration of impurities is generated from wastewater fed to said apparatus, comprising: boiler means for receiving and heating said wastewater under pressure to produce an impure concentrate and a steam component, said impure concentrate comprising a boiler dissolved solids containing component substantially free of suspended solids and a boiler sludge component containing suspended solids; bolwdown means having first means communicating with said boiler means for removing said sludge component, said blowdown means further including means for removing said sludge from said first means; and second means for removing said dissolved solids containing component from said boiler means and for treating said dissolved solids containing component to form said treated water stream and a useful industrial chemical wherein said second means further includes (A) controller means for measuring the conductivity of said dissolved solids containing component and in response to said conductivity withdrawing said dissolved solids containing component from said boiler means, (B) means for controlling the rate of flow of said dissolved solids containing component withdrawn from said boiler means in response to said controller means, (C) third means having a central chamber for receiving said flow of said dissolved solids containing component, end chambers defined by ion-permeable membranes separating said central chamber from said end chambers, said end chambers containing electrodes, and means for flowing a direct current from the electrodes transversely through said membranes and said chambers, said third means for diluting the concentration of said component entering said central chamber to form said treated water stream and for forming an industrial chemical in said end chambers, (D) means for introducing said dissolved solids containing component into said central chamber and (E) means for removing said treated water stream from said central chamber and said industrial chemical from said end chambers.

* * * * *

UNITED STATES PATENT OFFICE
CERTIFICATE OF CORRECTION

Patent No. 4,437,968              Dated   March 20, 1984

Inventor(s) Robert H. Elliott, Jr.

It is certified that error appears in the above-identified patent and that said Letters Patent are hereby corrected as shown below:

Column 5, line 60, "ler" should be "boiler"

Column 16, line 31, "bolwdown" should be "blowdown"

*Signed and Sealed this*

*Eleventh* Day of *December 1984*

[SEAL]

*Attest:*

GERALD J. MOSSINGHOFF

*Attesting Officer*    *Commissioner of Patents and Trademarks*